United States Patent
Wakida et al.

(10) Patent No.: US 7,043,381 B2
(45) Date of Patent: May 9, 2006

(54) SUBSTATION SYSTEM

(75) Inventors: Takayuki Wakida, Hitachi (JP);
Takashi Aihara, Hitachi (JP); Shigeru Miyazawa, Tokyo (JP); Yoshimune Matsuyama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/874,253

(22) Filed: Jun. 24, 2004

(65) Prior Publication Data

US 2004/0236526 A1 Nov. 25, 2004

Related U.S. Application Data

(63) Continuation of application No. 10/247,822, filed on Sep. 20, 2002, now Pat. No. 6,832,169.

(30) Foreign Application Priority Data

Jan. 29, 2002 (JP) ............................. 2002-020104

(51) Int. Cl.
*G06F 19/00* (2006.01)
(52) U.S. Cl. .................. 702/62; 702/57; 702/188; 700/292; 700/295; 340/870.02; 361/64
(58) Field of Classification Search ............... 702/57, 702/62, 188, 189; 700/292, 295; 340/870.02; 361/64
See application file for complete search history.

(56) References Cited

U.S. PATENT DOCUMENTS

| 5,798,634 | A | 8/1998 | Terada et al. ............... 323/207 |
| 6,005,759 | A | 12/1999 | Hart et al. ..................... 361/66 |
| 6,633,823 | B1* | 10/2003 | Bartone et al. ............... 702/57 |
| 6,671,586 | B1* | 12/2003 | Davis et al. ................. 700/295 |
| 6,675,071 | B1* | 1/2004 | Griffin et al. ............... 700/286 |
| 6,832,169 | B1* | 12/2004 | Wakida et al. ................ 702/62 |
| 2002/0107615 | A1* | 8/2002 | Bjorklund .................... 700/286 |
| 2002/0161558 | A1* | 10/2002 | Georges et al. ............. 702/189 |

(Continued)

FOREIGN PATENT DOCUMENTS

WO 00/76047 A1 12/2000

OTHER PUBLICATIONS

Tylavsky et al., 'Sources of Error in Substation Distribution Transformer Dynamic Thermal Modeling', Jan. 2000, IEEE Article, vol. 15, No. 1, pp. 178-185.*

(Continued)

*Primary Examiner*—Marc S. Hoff
*Assistant Examiner*—Elias Desta
(74) *Attorney, Agent, or Firm*—Crowell & Moring LLP

(57) ABSTRACT

A network which simplifies structure, realizes autonomous automation, digitalizes data, and effectively uses data is disclosed. A measuring card for measuring voltage and current according to values detected by the state detector that detects voltage and current of the system. A protection card performs a protective arithmetical operation according to values detected by the state detector and outputting a protection command to a controller. A control card performs a protective arithmetical operation according to values detected by the state detector and outputting a control command to a controller are integrated within an on-site cubicle. The protection card, measuring card, and control card are connected to the substation monitoring and controlling device via a serial bus which is shared by those cards, and data is sent and received between those cards and the monitoring and controlling device via the serial bus.

5 Claims, 2 Drawing Sheets

U.S. PATENT DOCUMENTS

2003/0158677 A1* 8/2003 Swarztrauber et al. ........ 702/62

OTHER PUBLICATIONS

Subramanian et al., 'Concepts and Realization of Fault Recording System in a Large Power Station', Mar. 1997, IEEE Article, No. 434, pp. 48-52.*

Raschio et al., 'Selection of Input Locations of Power System Control', Oct. 1998, IEEE Article, pp. 201-206.*

Brunello, G. et al. "An application of protective relaying scheme over an Ethernet LAN/WAN" IEEE Transmission and Distribution Conference and Exposition. (2001) pp. 522-526.

Marmonter, J. et al. "Increasing availability of GIS installations by using digital control, protection and monitoring systems" IEEE Power Engineering Society (2000) pp. 2055-2061.

Matair, S. et al. "Harmonic state estimation: a method for remote harmonic assessment in a deregulated utility network" IEEE Proc. Electric Utility Deregulation and Restructuring and Power Technologies (2000) pp. 41-46.

Pilzeker, P. et al. "On-site investigations of gas insulated substations using ion mobility spectrometry for remote sensing of $SF_2$ decomposition" IEEE International Symposium on Electrical Insulation (2000) pp. 400-403.

* cited by examiner

SUBSTATION SYSTEM

This application is a continuation/division of application Ser. No. 10/247,822, filed Sep. 20, 2002 now U.S. Pat. No. 6,832,169.

BACKGROUND OF THE INVENTION

The present invention relates to a substation system and more specifically to a substation system that applies information technology (IT) to apparatuses for protecting and controlling transformation equipment connected to the power system in order to reduce the size of the transformation equipment, enable autonomous automation, digitalize data, and effectively use the data by utilizing a network.

Among power systems, a power transmission system and a power distribution system are equipped with a substation that boosts or reduces outputs from a power generator or reduces voltage of the system. In addition to a transformer that boosts or deboosts voltage, the substation has a device for collecting and distributing electric power, a device or system for controlling power flow, and a device for protecting and controlling devices located inside the substation.

For example, a circuit breaker used for a gas insulating switchgear (GIS) is equipped with a gas pressure sensor for detecting gas pressure, an acceleration sensor for detecting signals emitted in association with a problem, and a current and voltage detector; and a transformer is equipped with a thermometer, pressure gauge, oil-level sensor, and current detector as sensors that detect the state of the transformer.

These sensors are connected to a protection device, measuring device, control device, and device monitoring device via cables that transmit electric signals. Furthermore, the protection device, measuring device, control device, and device monitoring device are connected to a higher-rank substation monitoring and controlling device via individual cables that transmit electric signals.

The substation monitoring and controlling device monitors the state of the circuit breaker and the transformer based on the information obtained by various sensors, displays the monitored results on the screen, and outputs operation commands to the circuit breaker and the like. That is, it monitors the state of the substation at a remote location and remotely operates the circuit breaker and the like.

In conventional technology, a plurality of devices arranged at a lower-rank side are individually connected to the substation monitoring and controlling device via individual cables, thereby using several cables, which complicates the structure. Further, a plurality of lower-rank side devices are connected to each sensor, which uses several cables and even further complicates the structure.

Furthermore, protection, control, and monitor of devices at a remote location also complicate the structure of the substation system. Moreover, the use of analog signals prevents effective use of data.

SUMMARY OF THE INVENTION

The objective of the present invention is to provide a substation system that enables simplification of the structure and effective use of data.

To solve said problems, the present invention comprises a state detector for detecting the state of monitored objects connected to a power system; a controller for controlling controlled objects connected to said power system according to control information; a monitor-information creating device for exchanging information with said state detector using digital signals as media and also creating information about the state of said monitored objects; and a control-information creating device for creating control information for controlling said controller, converting the created control information along with received control information into digital signals and transmitting the signals to said controller, wherein said monitor-information creating device and said control-information creating device are connected to a monitoring and controlling device for collecting information about the state of said monitored objects and outputting control information for controlling said controlled objects via a signal transmission path shared by those devices, and exchange information with said monitoring and controlling device using digital signals as media.

DESCRIPTION OF THE INVENTION

Figure 1:
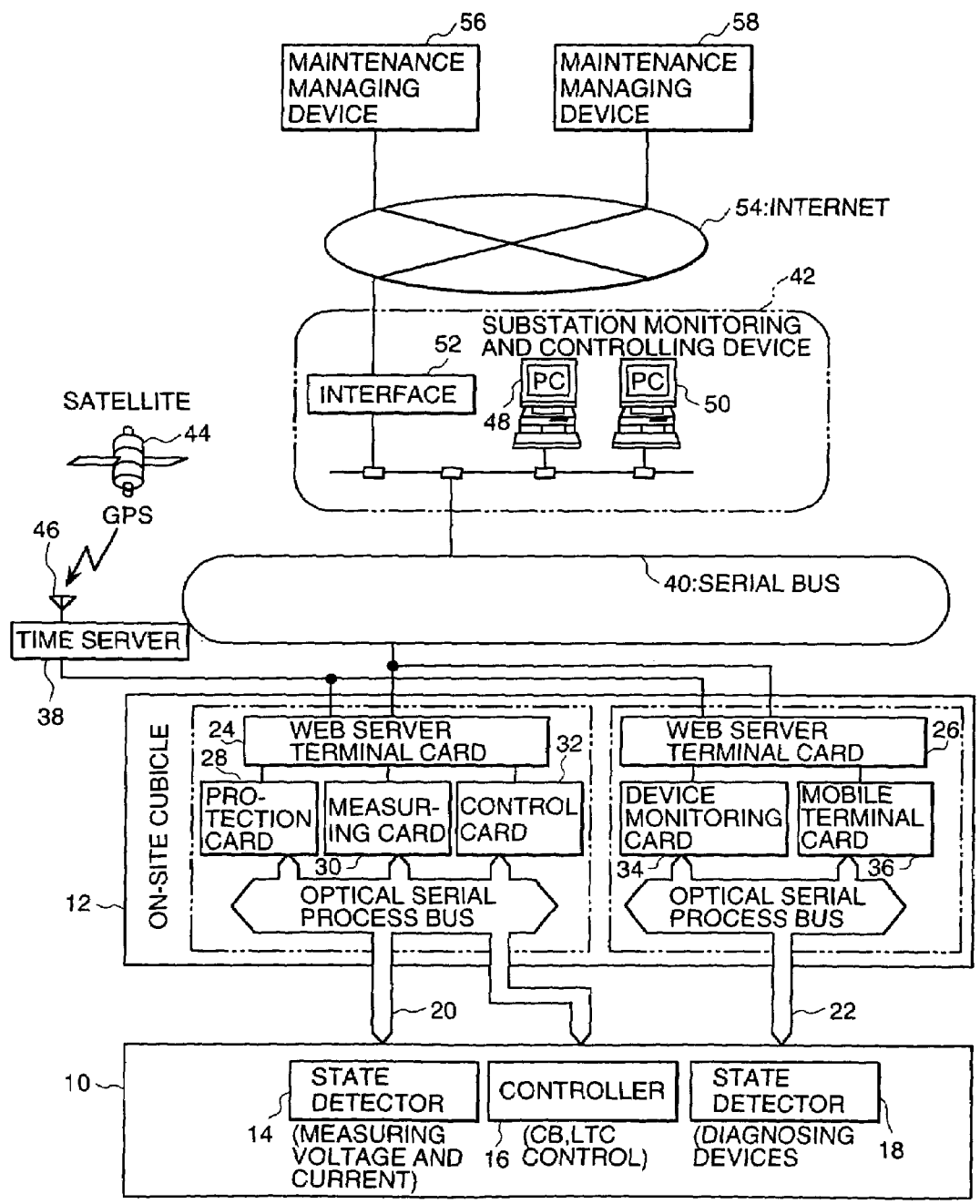
FIG. 1 is a schematic diagram showing a system according to an embodiment of the present invention.

An embodiment of the present invention will be described with reference to the drawings. FIG. 1 is a schematic diagram of a system in accordance with an embodiment of the present invention. In FIG. 1, among power systems, a substation that is connected to a power transmission system or a power distribution system is equipped with transformation equipment 10, such as a transformer, circuit breaker, and disconnector (not shown), which are monitored and controlled objects. An on-site cubicle 12 is installed near the transformation equipment 10.

The transformation equipment 10 comprises a state detector 14 for detecting the state of the monitored objects (circuit breaker, transformer, etc.), a controller 16 for controlling the controlled objects (circuit breaker, etc.) according to control information, and another state detector 18.

Figure 2:
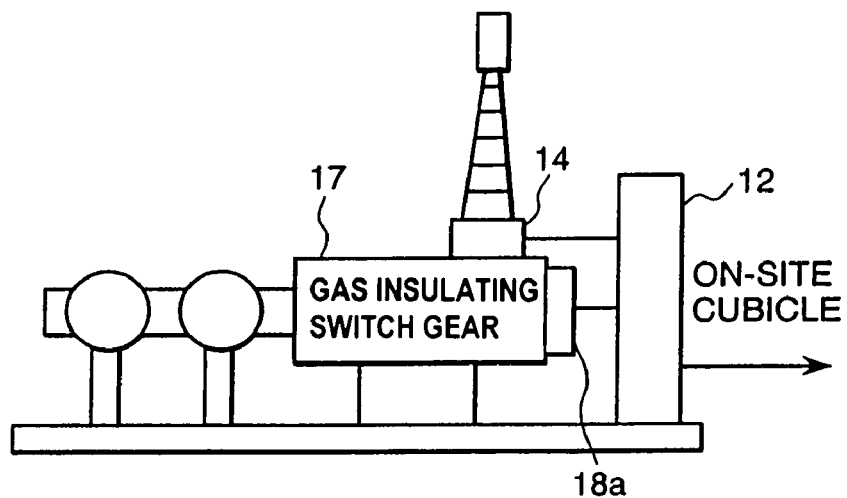
FIG. 2 illustrates an example in which state detectors are installed in a GIS.

The state detector 14 is, for example, as shown in FIG. 2, installed in a gas insulating switchgear (GIS) 17 and comprises a wire-wound PCT (Potential Current Transformer) sensor for measuring voltage and current of the system and an electro-optic converter for converting electric signals detected by the PCT sensor into optical signals. The electro-optic converter is connected to an optical serial process bus 20.

The controller 16 is installed in the GIS 17 and comprises an opto-electric converter for converting optical signals sent from the optical serial process bus 20 into electric signals and an actuator or a trip coil for controlling the GIS 17 according to a protection command or an operation command that is output from the opto-electric converter.

Figure 3:
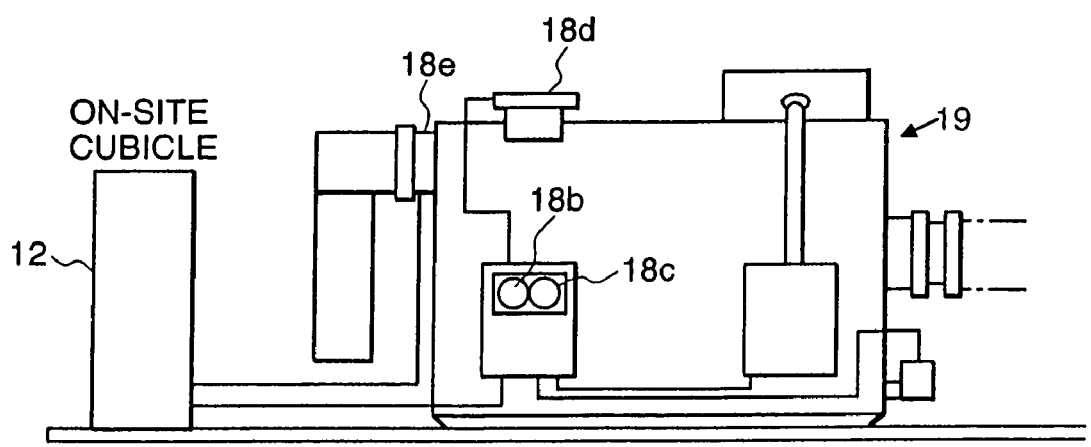
FIG. 3 illustrates an example in which state detectors are installed in a transformer.

The state detector 18 is installed in the GIS 17 shown in FIG. 2 or in a transformer 19 shown in FIG. 3, and comprises, as device monitoring sensors for sensing the state of various devices, a gas pressure sensor 18a for detecting gas pressure in the GIS 17, a temperature sensor 18b for detecting temperature in the transformer 19, a pressure sensor 18c for detecting nitrogen gas pressure in the transformer 19, an oil-level sensor 18d for detecting the oil level in the transformer 19, a current sensor 18e for detecting current in the transformer 19, and also has an electro-optic converter for converting electric signals that are output from each sensor into optical signals. The electro-optic converter is connected to the optical serial process bus 22. Furthermore, the device monitoring sensors can include a humidity sensor for detecting humidity by means of a switchgear (SWGR), a sonic sensor for detecting vibration, an insulation deterioration sensor for detecting insulation deterioration, and an odor sensor for detecting overheating of a device.

As shown in FIG. 1, within an on-site cubicle 12, Web server terminal cards 24 and 26, a protection card 28, a measuring card 30, a control card 32, a device monitoring card 34, and a mobile terminal card 36 are integrated with optical serial process buses 20 and 22. Each Web server terminal card 24 and 26 is connected to a time server 38, and also connected to a substation monitoring and controlling device 42 via a serial bus 40.

The protection card 28 is structured as a protective device which performs an arithmetical operation based on the information sent from the state detector 14 in order to protect controlled objects and outputs a protection command as control information. The measuring card 30 is structured as a measuring instrument which measures, for example, voltage and current of the system or voltage and current of the GIS 17 based on the information sent from the state detector 14 to check the state of the monitored objects, and outputs measurements to the Web server terminal card 24. The control card 32 is structured as a control device which performs an arithmetical operation based on the information sent from both the state detector 14 and the substation monitoring and controlling device 42 in order to control the controlled objects, and outputs an operation command and a trip command to the controller 16 as control information. The device monitoring card 34 is structured as a device monitor which indicates the presence or absence of a problem in objects being monitored based on the information sent from the state detector 18 and outputs the results to the Web server terminal card 26. The mobile terminal card 36 is structured as a device which performs an arithmetical operation so as to exchange information with a mobile terminal.

That is, the measuring card 30 and the device monitoring card 34 are structured as monitor-information creating devices which exchange information with the state detectors 14 and 18 via optical serial process buses 20 and 22, respectively, (by using optical signals as media), and create information about the state of the objects being monitored. The protection card 28 and the control card 32 are structured as control-information creating devices which create control information for controlling the controller 16, convert the created control information along with control information received from the serial bus 40 into optical signals, and transmit the signals to the controller 16. Those monitor-information creating devices and control-information creating devices are integrated within the on-site cubicle 12.

The Web server terminal cards 24 and 26 exchange information, for example, based on HTML (Hypertext Markup Language), with the protection card 28, measuring card 30, control card 32, and device monitoring card 34, transmit information from those cards as digital serial data to the substation monitoring and controlling device 42 via the serial bus 40, receive serial data from the substation monitoring and controlling device 42 via the serial bus 40, and distribute the received data to each card.

Furthermore, the Web server terminal cards 24 and 26 receive time information from a time server 38 and distribute the time information to each card so that the time can be synchronized among the cards. That is, the time server 38 receives GPS (Global Positioning System) signals from a satellite 44 via an antenna 46 and transmits time information contained in the GPS signals to the Web server terminal cards 24 and 26.

The serial bus 40, which constitutes a signal transmission path, is structured as a substation in-house LAN (Local Area Network), and serial data transmitted via the serial bus 40 is created in accordance with an international standard protocol (communication standards), for example, a protocol IEC 61850 or 61375 specified by the International Electrotechnical Commission (IEC). The protection card 28, measuring card 30, control card 32, and device monitoring card 34 are connected to the serial bus 40 via the Web server terminal circuits 24 and 26, and are also connected to the substation monitoring and controlling device 42 via the single serial bus 40 shared by those cards.

The substation monitoring and controlling device 42 is equipped with personal computers 48 and 50 to function as a device which collects information about the state of the objects being monitored and outputs control information, for example, an operation command and a trip command to control the controlled objects. The personal computers 48 and 50 are connected to the serial bus 40, and also connected, via an interface 52, to the Internet 54 which is a communication network. The screen of each personal computers 48 and 50 displays images about the state of each monitored object, and each personal computer 48 and 50 outputs various operation commands as control information based on the operation by an operator. It is possible to use an intranet or a public line as a communication line instead of the Internet 54.

Both a maintenance managing device 56, which is a maintenance base for an electric power company, and another maintenance managing device 58, which is a maintenance base for a manufacturing company that manufactures devices for the substation, are connected to the Internet 54.

Operated by a maintenance engineer, the maintenance managing devices 56 and 58 exchange information with the substation monitoring and controlling device 42 via the Internet 54, monitor the presence or absence of a problem in objects being monitored based on the information sent from the monitoring and controlling device 42, and carry out trend management and history management of the monitored objects at a remote location. In this case, each maintenance managing device 56 and 58 establishes a database to incorporate necessary data via the Internet 54, and based on the data stored in the database, each maintenance managing device performs various analyses, diagnoses about the monitored objects and controlled objects, thereby confirming indications of potential problems or immediately taking countermeasures in case of an occurrence of a problem. Moreover, by making a preventive maintenance plan, managing inspection history, and performing parts management based on the analytic results and diagnostic results, it is possible to simultaneously increase both efficiency and reliability of maintenance and operations.

According to this embodiment, the protection card 28, measuring card 30, control card 32, and device monitoring card 34 can exchange information with the substation monitoring and controlling device 42 via the single serial bus 40 shared by those cards, thereby reducing the number of cables to one cable and simplifying the structure.

Furthermore, according to this embodiment, the protection card 28, measuring card 30, control card 32, device monitoring card 34, and mobile terminal card 36 are connected to the state detectors 14 and 18 and the controller 16 via optical serial process buses 20 and 22; therefore, the number of cables that connect those cards to the state detectors 14 and 18 or the controller 16 can be reduced, which simplifies the structure.

Moreover, according to this embodiment, the protection card 28, measuring card 30, control card 32, device monitoring card 34, and mobile terminal card 36 are integrated within the on-site cubicle 12; consequently, the system can have high performance and its size can be small.

Furthermore, according to this embodiment, serial data transmitted via the serial bus 40 is in accordance with an international standard protocol; therefore, connections between different manufacturers' products can be standardized.

Moreover, in this embodiment, a wire-wound PCT sensor has been described which is used as a voltage and current measuring sensor; however, by using a non-iron-core Rogowski coil as a current measuring sensor and using a sensor that divides voltage by means of a plurality of capacitors as a voltage measuring sensor, it is possible to reduce a power loss further than the wire wound PCT sensor and also reduce the size of the system.

As described above, according to the present invention, both monitor-information creating devices and control-information creating devices are connected to the monitoring and controlling device via a signal transmission path which is shared by those devices. This makes it possible to simplify the structure, realize autonomous automation, digitalize data, and effectively use data by utilizing a network.

What is claimed is:

1. A substation system comprising:
   a protection state detector for detecting a state of monitored objects connected to a power system and for protecting the state of said monitored objects;
   a monitor state detector for detecting the state of said monitored objects connected to said power system and for monitoring the state of said monitored objects;
   a controller for controlling controlled objects connected to said power system according to control information;
   a monitor-information creating device for exchanging information with said monitor state detector using digital signals as media and also creating information about the state of said monitored objects;
   a control-information creating device for creating control information for controlling said controller, converting the created control information along with received control information into digital signals and transmitting the signals to said controller; and
   said monitor-information creating device and said control-information creating device connected to a monitoring and controlling device for collecting information about the state of said monitored objects and outputting control information for controlling said controlled objects via a signal transmission path shared by those devices, and exchange information with said monitoring and controlling device using digital signals as media;
   wherein said monitor-information creating device is connected to said protection state detector and said controller via a protection signal transmission path; and
   said control-information creating device is connected to said monitor state detector via a monitor signal transmission path.

2. A substation system according to claim 1, wherein said monitor-information creating device and said control-information creating device are integrated within a cubicle and installed near said monitored and controlled objects.

3. A substation system according to claim 1, wherein said state detector converts the state of said monitored objects into electric signals, converts the electric signals into digital signals, and outputs the signals; and said controller converts received digital signals into electric signals and outputs the signals to said controller.

4. A substation system according to claim 1, wherein optical communication is used as a communication medium for said digital signals.

5. A substation system according to claim 1, wherein said signal transmission path transmits information in accordance with an international standard protocol.

* * * * *